United States Patent Office 3,270,004
Patented August 30, 1966

3,270,004
DISUBSTITUTED PIPERAZINES USEFUL AS SCHISTOSOMIASIS AGENTS
Arthur Alter, Waukegan, Ill., assignor to Abbott Laboratories, North Chicago, Ill., a corporation of Illinois
No Drawing. Filed Dec. 26, 1962, Ser. No. 247,352
17 Claims. (Cl. 260—239)

This is a continuation-in-part of application Serial No. 175,336, filed February 23, 1962, now abandoned.

This invention is concerned with novel compounds of the formula

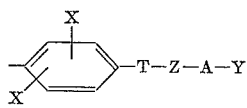

as well as their non-toxic, acid-addition salts and a method for their preparation. In this and succeeding formulas, each X is halogen (preferably chlorine or bromine) or loweralkyl; T is piperazine, methylpiperazine, homopiperazine or methylhomopiperazine; Z is a straight or branched alkylene or alkenylene radical containing from 1 to 12 carbon atoms; A is oxygen or sulfur and Y is naphthyl, halonaphthyl or a radical of the formula

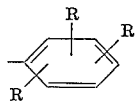

wherein each R is hydrogen, halogen, nitro, amino, loweralkylamino, diloweralkylamino, straight or branched alkyl containing 1 to 12 carbon atoms, loweralkoxy, alkenyl containing from 2 to 12 carbon atoms or aralkyl such as cyclohexyl and benzyl. The terms "loweralkyl" or "loweralkoxy" mean those alkyl or alkoxy radicals containing from 1 to 4 carbon atoms, inclusive, either straight or branched.

These new compounds are active schistosomiasis agents. In a representative operation, mice infested with *S. mansoni* were orally administered from 100 to 300 mg. per kg. of N - (3-chloro-4-methylphenyl)-N'-(4'-t-amylphenoxyhexamethylene)-piperazine daily for five days which resulted in substantially complete kill of the worms causing the infection. Preferred compounds of this invention have the formula

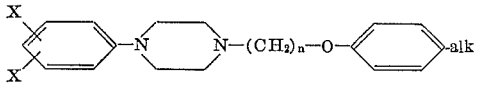

wherein *n* is 2 to 12 and alk is a straight or branched alkyl radical containing from 1 to 12 carbon atoms. More particularly, the preferred compounds can be illustrated by the formula

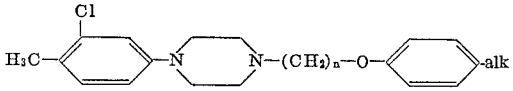

wherein *n* and alk are as previously defined.

The compounds of the invention can be prepared by refluxing equimolar amounts of a compound of the formula

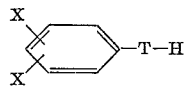

with a compound of the formula hal-Z—A—Y wherein hal is chlorine or bromine in an inert solvent such as benzene or toluene and in the presence or absence of a hydrohalide acceptor such as triethylamine or pyridine. When the reaction is complete, the reaction mixture is filtered, the filtrate concentrated, the residue dissolved in ether and further treated with alcoholic hydrogen chloride to precipitate the product as a crystalline solid in the form of its hydrochloride. If desired, the free base contained in the filtrate can be reacted with ethereal hydrogen bromide or other acids to form the corresponding hydrobromide, hydroiodide, sulfate, phosphate, acetate, benzoate, salicylate, glycolate, succinate, nicotinate, ascorbate, tartrate, maleate or lactate.

The substituted piperazines and homopiperazines employed as one of the reactants in the present invention are known or can be prepared by methods known per se. A typical method is illustrated in Step A of Example 1. In like manner, the reaction of 3,4-dimethylaniline and diethanolamine will provide 1-(3,4-dimethylphenyl)-piperazine which boils at 135° C. at 0.6 mm. pressure. Similarly, the reaction of 3-bromo-4-methylaniline and diethanolamine results in the formation of 1-(3-bromo-4-methylphenyl)-piperazine having a boiling point of 147° C. at 1.4 mm. pressure and a refractive index $n_D^{25}$ of 1.6082. Likewise, the reaction of 3-chloro-4-methylaniline with a compound of the formula $$OH-CH_2-CH_2-NH-CH_2-CH_2-CH-OH$$
$$\phantom{OH-CH_2-CH_2-NH-CH_2-CH_2-CH-}|$$
$$\phantom{OH-CH_2-CH_2-NH-CH_2-CH_2-CH-}CH_3$$

will form 1-(3-chloro-4-methylphenyl)-5-methylhomopiperazine boiling at 128° C. at 0.5 mm. pressure.

The halides also employed as one of the reactants in the present invention are likewise known or can be prepared by methods in themselves well known to those skilled in the art. A typical method is illustrated in Step B of Example 1. The physical properties of representative bromides and chlorides which have been thus prepared are shown in the table below.

TABLE 1

| Formula of Bromide or Chloride | B.P. in °C./mm. | $n_D^{25}$ |
|---|---|---|
| 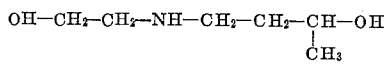—O—(CH$_2$)$_6$—Br | 125/0.5 | 1.5221 |
| t-C$_4$H$_9$—⟨ ⟩—S—(CH$_2$)$_6$—Br | 186/1.8 | 1.5433 |
| t-C$_5$H$_{11}$—⟨ ⟩—O—(CH$_2$)$_2$—Br | 124/1.0 | 1.5282 |
| t-C$_5$H$_{11}$—⟨ ⟩—O—(CH$_2$)$_3$—Br | 140/0.8 | 1.5091 |
| t-C$_5$H$_{11}$—⟨ ⟩—O—(CH$_2$)$_4$—Br | 175/4.4 | 1.5240 |
| t-C$_5$H$_{11}$—⟨ ⟩—O—(CH$_2$)$_5$—Br | 175/2.0 | 1.5205 |
| t-C$_5$H$_{11}$—⟨ ⟩—O—(CH$_2$)$_7$—Br | 177/1.1 | 1.514 |
| t-C$_5$H$_{11}$—⟨ ⟩—O—(CH$_2$)$_8$—Br | 211/3.0 | 1.5135 |
| t-C$_5$H$_{11}$—⟨ ⟩—O-CH$_2$-CH=CH-CH$_2$-Cl | 162/1.0 | 1.5272 |
| t-C$_5$H$_{11}$—⟨ ⟩(Cl)—O—(CH$_2$)$_6$—Br | 184/0.7 | 1.5294 |
| t-C$_5$H$_{11}$—⟨ ⟩—O—CH(CH$_3$)—(CH$_2$)$_5$—Br | 165/3.4 | 1.5185 |

TABLE 1.—Continued

| Formula of Bromide or Chloride | B.P. in °C./mm. | $n_D^{25}$ |
|---|---|---|
| t-$C_5H_{11}$—⟨phenyl⟩—O—CH(CH$_3$)—(CH$_2$)$_2$—CH(CH$_3$)—Br | 171/4.1 | 1.5143 |
| t—$C_5H_{11}$—⟨phenyl, 2,6-diCl⟩—O—(CH$_2$)$_6$—Br | 200/0.5 | 1.5318 |
| t—$C_5H_{11}$—⟨phenyl, t-$C_5H_{11}$⟩—O—(CH$_2$)$_4$—Br | 159/0.5 | 1.5127 |
| t—$C_8H_{17}$—⟨phenyl⟩—O—(CH$_2$)$_2$—Br | 155/1.0 | 1.5212 |
| t—$C_8H_{17}$—⟨phenyl⟩—O—(CH$_2$)$_3$—Br | 150/0.7 | 1.5201 |
| t—$C_8H_{17}$—⟨phenyl⟩—O—(CH$_2$)$_4$—Br | 174/1.5 | 1.5181 |
| t—$C_8H_{17}$—⟨phenyl⟩—O—(CH$_2$)$_5$—Br | 195/2.2 | 1.5160 |
| t—$C_8H_{17}$—⟨phenyl⟩—O—(CH$_2$)$_6$—Br | 210/1.7 | 1.5180 |
| t—$C_8H_{17}$—⟨phenyl⟩—O—(CH$_2$)$_7$—Br | 211/2.0 | 1.5120 |
| t—$C_8H_{17}$—⟨phenyl⟩—O—CH(CH$_3$)—(CH$_2$)$_3$—Br | 190/4.4 | 1.5140 |
| t—$C_8H_{17}$—⟨phenyl⟩—O—CH(CH$_3$)—(CH$_2$)$_2$—CH(CH$_3$)—Br | 190/4.8 | 1.5122 |
| t—$C_9H_{19}$—⟨phenyl⟩—O—(CH$_2$)$_6$—Br | 181/0.1 | 1.5117 |
| t—$C_9H_{19}$—⟨phenyl, t$C_9H_{19}$⟩—O—(CH$_2$)$_6$—Br | 230/2.3 | 1.4987 |
| t—$C_9H_{19}$—⟨phenyl⟩—S—(CH$_2$)$_6$—Br | 205/0.2 | 1.5315 |
| t—$C_{12}H_{25}$—⟨phenyl⟩—O—(CH$_2$)$_5$—Br | 198/0.7 | ------ |
| $CH_3$—⟨phenyl, t$C_4H_9$⟩—O—(CH$_2$)$_6$—Br | 184/2.5 | 1.5147 |
| $CH_3$—$(CH_2)_3$—O—⟨phenyl⟩—O—(CH$_2$)$_4$—Br | 168/1.3 | ------ |
| $CH_2$=CH—$CH_2$—⟨phenyl, O$CH_3$⟩—O—(CH$_2$)$_5$—Br | 215/7.0 | 1.5384 |
| 1-Br-naphthyl-2-O—(CH$_2$)$_3$—Br | 193/0.9 | 1.6460 |
| 1-Br-naphthyl-2-O—(CH$_2$)$_4$—Br | 220/2.5 | 1.6342 |

TABLE 1.—Continued

| Formula of Bromide or Chloride | B.P. in °C./mm. | $n_D^{25}$ |
|---|---|---|
| Cl—⟨phenyl⟩—O—(CH$_2$)$_4$—Cl | 174/0.1 | 1.5737 |
| ⟨phenyl, cyclohexyl⟩—O—(CH$_2$)$_5$—Br | 224/4.0 | ------ |
| Cyclohexyl—⟨phenyl⟩—O—(CH$_2$)$_4$—Cl | 204/7.0 | ------ |
| ⟨phenyl, 2,6-diCl⟩—O—(CH$_2$)$_4$—Br | 193/6.0 | 1.5635 |
| ⟨phenyl, CH$_3$⟩—O—(CH$_2$)$_5$—Br | 174/7.0 | 1.5304 |
| ⟨phenyl, CH$_3$⟩—O—(CH$_2$)$_4$—Cl | 146/7.0 | 1.5193 |
| n—$C_6H_{13}$—⟨phenyl⟩—O—(CH$_2$)$_6$—Br | 220/6.0 | 1.5113 |
| Isopropyl—⟨phenyl⟩—O—(CH$_2$)$_6$—Br | 189/5.0 | 1.5182 |
| ⟨phenyl, sec. butyl⟩—O—(CH$_2$)$_4$—Cl | 153/7.0 | ------ |
| Cl—⟨phenyl⟩—O—(CH$_2$)$_6$—Br | 194/7.0 | 1.5347 |
| Cl—⟨phenyl⟩—O—(CH$_2$)$_5$—Br | 190/8.0 | 1.5438 |
| Cl—⟨phenyl, 2,6-diCl⟩—O—(CH$_2$)$_6$—Br | 196/5.0 | 1.5471 |
| Cl—⟨phenyl, 2,6-diCl⟩—O—(CH$_2$)$_4$—Cl | 184/8.0 | 1.5491 |
| ⟨phenyl, 2,6-diCl⟩—O—(CH$_2$)$_6$—Br | 187/3.0 | 1.5441 |
| $O_2N$—⟨phenyl, CH$_3$⟩—O—(CH$_2$)$_6$—Cl | 175/0.5 | 1.5330 |
| $(CH_3)_2$—N—⟨phenyl⟩—O—(CH$_2$)$_4$—Cl | (¹) | ------ |

¹ M.P.=64° C.

The following examples illustrate some specific embodiments of the invention but are not to be interpreted as limiting the same.

Example 1

*Step A.*—Preparation of 1-(3-chloro-4-methylphenyl)-piperazine.

To an ice-cooled mixture of 47.3 g. (0.45 mole) of diethanolamine and 56.6 g. (0.4 mole) of 3-chloro-4-amino toluene was added slowly with stirring 100 ml. of hydrobromic acid. The mixture was then heated at 200° C. for 8 hours during which time the water formed was continuously removed by distillation. The solid mass which resulted was dissolved in water and made alkaline with 40% aqueous sodium hydroxide. The aqueous mixture was treated with benzene, the benzene layer dried and fractionally distilled at reduced pressure to obtain the desired 1-(3-chloro-4-methylphenyl)-piperazine which boiled at 150°–156° C. at 2 mm. pressure and had a refractive index $n_D^{25}$ of 1.5900.

*Step B.*—Preparation of para-t-amylphenoxyhexamethylene bromide.

To a refluxing mixture of 262.4 g. (1.6 moles) of para-t-amylphenol and 488 g. (2.0 moles) of hexamethylenedibromide was added slowly with stirring 64 g. (1.6 moles) of sodium hydroxide dissolved in one liter of water. When the reaction was complete, the low boiling fractions were removed by distillation and the residue fractionally distilled to obtained the desired bromide product which boiled at 189°–194° C. at 2 mm. pressure and had a refractive index $n_D^{25}$ of 1.5174.

*Step C.*—Preparation of N-(3-chloro-4-methyl-phenyl)-N'-(4'-t-amylphenoxyhexamethylene)-piperazine.

A mixture of 10.6 g. (0.05 mole) of the compound prepared in Step A, 16.4 g. (0.05 mole) of the compound prepared in Step B, 10.1 g. (0.10 mole) of triethylamine and 125 ml. of toluene was refluxed overnight. The reaction mixture was then filtered and the filtrate concentrated. The residue was dissolved in ether and treated with alcoholic hydrogen chloride to precipitate the desired product as the hydrogen chloride salt which upon recrystallization from benzene melted at 165° C.

Examples 2–19

In the same manner as that described in Example 1, the refluxing of equimolar quantities of 1-(3-chloro-4-methylphenyl)-piperazine and the appropriate bromide or chloride listed in Table I will produce piperazine compounds of the formula

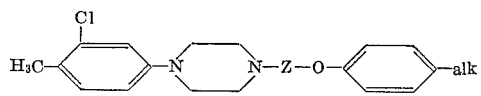

wherein Z and alk are as indicated below.

| Z | Alk | M.P. in °C. of HCl salt of Piperazine Obtained |
|---|---|---|
| —(CH$_2$)$_4$— | t-Butyl | 200 |
| —(CH$_2$)$_2$— | t-Amyl | 200 |
| —(CH$_2$)$_3$— | do | 175 |
| —(CH$_2$)$_4$— | do | 182 |
| —(CH$_2$)$_5$— | do | 171 |
| —(CH$_2$)$_7$— | do | 168 |
| —(CH$_2$)$_3$—CH(CH$_3$)— | do | 148 |
| —CH(CH$_3$)—(CH$_2$)$_2$—CH(CH$_3$)— | do | [1] 170 |
| —(CH$_2$)$_2$— | t-Octyl | 163 |
| —(CH$_2$)$_3$— | do | 178 |
| —(CH$_2$)$_4$— | do | 162 |
| —(CH$_2$)$_5$— | do | 177 |
| —(CH$_2$)$_6$— | do | 165 |
| —(CH$_2$)$_7$— | do | 175 |
| —CH(CH$_3$)—(CH$_2$)$_3$—CH(CH$_3$)— | do | [1] 158 |
| —(CH$_2$)$_3$—CH(CH$_3$)— | do | [1] 172 |
| —(CH$_2$)$_6$— | t-Nonyl | 175 |
| —(CH$_2$)$_5$— | n-Dodecyl | [1] 76 |

[1] Means dihydrochloride.

Examples 20–30

In like manner, the reaction of 1-(3-chloro-4-methylphenyl)-piperazine with the proper bromide or chloride listed in Table I will form compounds of the formula

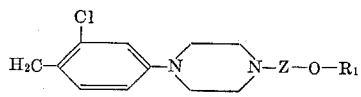

wherein Z and R$_1$ are as shown below:

| Z | R$_1$ | M.P. in °C. of HCl salt of Piperazine Obtained |
|---|---|---|
| —(CH$_2$)$_3$— | Br-naphthyl | 208 |
| —(CH$_2$)$_4$— | butoxy-phenyl | 138 |
| —(CH$_2$)$_4$— | cyclohexyl-phenyl | 187 |
| —(CH$_2$)$_4$— | Cl-phenyl (benzyl position) | 139 |
| —(CH$_2$)$_4$— | Br-naphthyl | 193 |
| —(CH$_2$)$_5$— | OCH$_3$, CH$_2$—CH=CH$_2$-phenyl | 161 |
| —(CH$_2$)$_6$— | phenyl | 157 |
| —(CH$_2$)$_6$— | cyclohexyl | 160 |
| —(CH$_2$)$_6$— | CH$_2$-phenyl (diphenylmethyl) | — |
| —(CH$_2$)$_6$— | t-nonyl, t-nonyl-phenyl | [1] 170 |
| —(CH$_2$)$_6$— | CH$_3$, NO$_2$-phenyl | [1] 169 |

[1] Means dihydrochloride.

Examples 31–33

By replacing 1-(3-chloro-4-methylphenyl)-piperazine with 1-(3-bromo-4-methylphenyl)-piperazine or 1-(3,4-dimethylphenyl)-piperazine in the preceding examples, the corresponding substituted piperazine compounds are obtained which can be readily converted to any acid-addition salt desired. Thus, the following compounds are prepared.

| | M.P. in °C. of HCl salt |
|---|---|
| 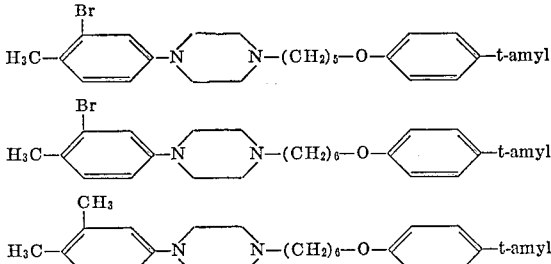 | 176 |
| 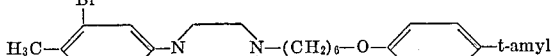 | 164 |
|  | 174 |

Example 34

The reaction of 1-(3-chloro-4-methylphenyl)-homopiperazine, 1-(3-bromo-4-methylphenyl)-homopiperazine, a 1-(dihalophenyl)-methylpiperazine, a 1-(dihalophenyl)-methylhomopiperazine, a diloweralkylphenylpiperazine or a dihalophenylpiperazine with any of the bromides or chlorides shown in Table 1 will produce the corresponding substituted derivatives illustrative of which is

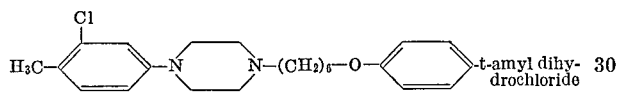

having a melting point of 208° C.

Example 35

Reacting a piperazine compound of the formula

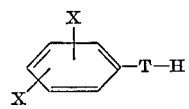

with a halide of the formula hal-Z—S—Y wherein hal is chlorine or bromine will result in the formation of the corresponding derivatives of the general formula

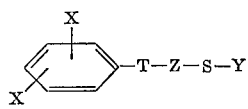

Illustrative of this type of compound is

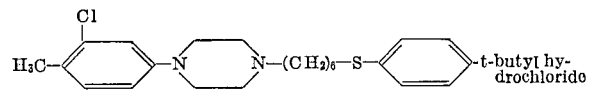

melting at 146° C.

Other compounds considered to be within the scope of the present invention can be represented as follows:

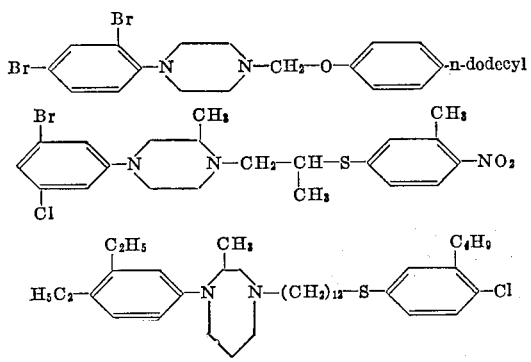

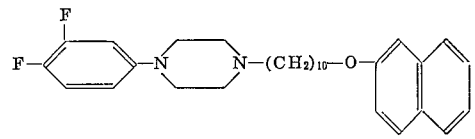

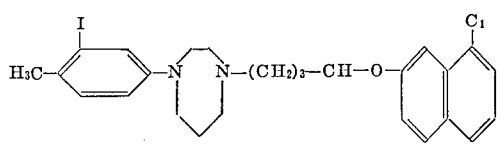

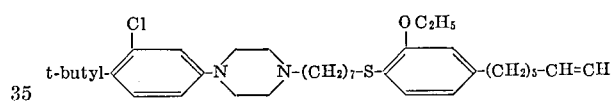

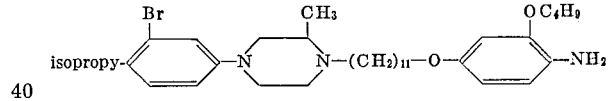

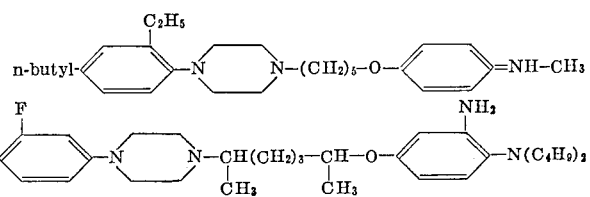

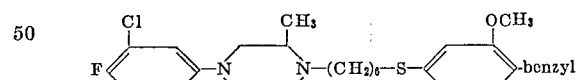

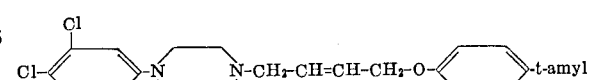

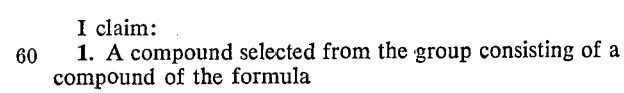

I claim:
1. A compound selected from the group consisting of a compound of the formula

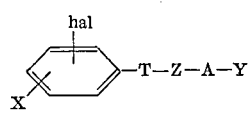

and non-toxic, acid-addition salts thereof wherein X is lower alkyl, T is selected from the group consisting of piperazine, methylpiperazine, homopiperazine and methylhomopiperazine, Z is selected from the group consisting of straight and branched alkenylene of from 1 to 12 carbon atoms and alkenylene radicals of from 2 to 12 carbon atoms, A is selected from the group consisting of oxygen and sulfur, and Y is selected from the group consisting of naphthyl, halonaphthyl and

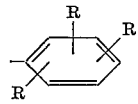

wherein each R is independently selected from the group consisting of hydrogen, halogen, nitro, amino, loweralkylamino, diloweralkylamino, alkyl of from 1 to 12 carbon atoms, loweralkoxy, alkenyl of from 2 to 12 carbon atoms, cyclohexyl and benzyl.

2. A compound of the formula

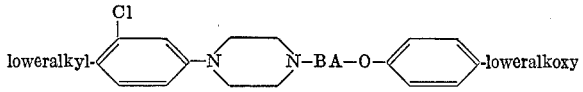

wherein BA is branched alkylene containing from 2 to 12 carbon atoms.

3. A compound of the formula

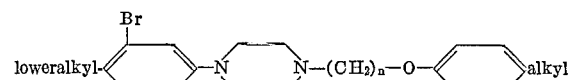

wherein $n$ is a whole number from 1 to 12 inclusive and alkyl contains from 1 to 12 carbon atoms.

4. A compound of the formula

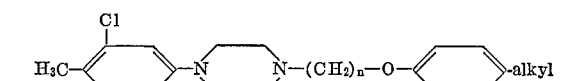

wherein $n$ is a whole number from 1 to 12 inclusive and alkyl contains from 1 to 12 carbon atoms.

5. A compound of the formula

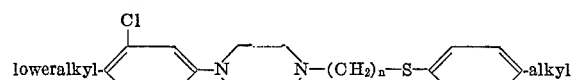

wherein $n$ is a whole number from 1 to 12 inclusive and alkyl contains from 1 to 12 carbon atoms.

6. A compound of the formula

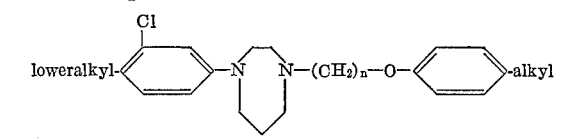

wherein $n$ is a whole number from 1 to 12 inclusive and alkyl contains from 1 to 12 carbon atoms.

7. A compound of the formula

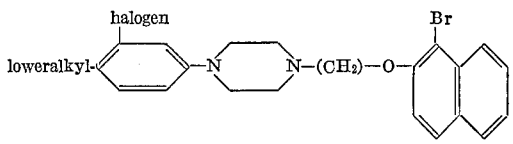

wherein $n$ is a whole number from 1 to 12 inclusive.

8. A compound of the formula

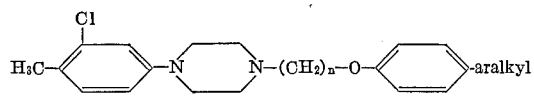

wherein $n$ is a whole number from 1 to 12 inclusive and aralkyl is benzyl.

9. A compound of the formula

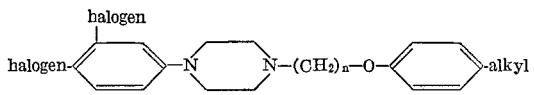

wherein $n$ is a whole number from 1 to 12 inclusive and alkyl contains from 1 to 12 carbon atoms.

10. A compound of the formula

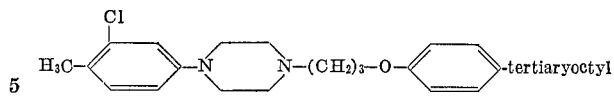

11. A compound of the formula

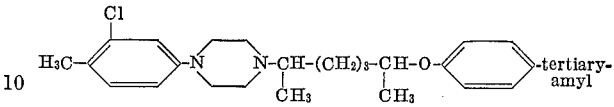

12. A compound of the formula

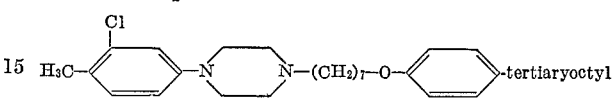

13. A compound of the formula

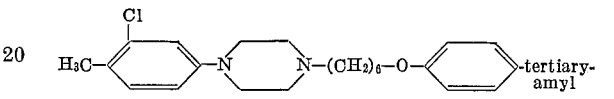

14. A compound of the formula

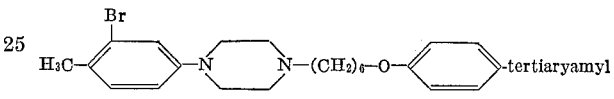

15. A compound of the formula

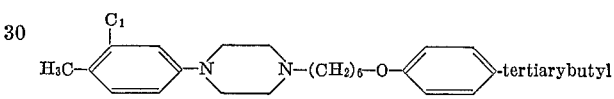

16. A compound of the formula

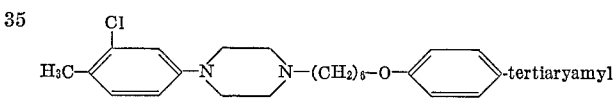

17. A compound of the formula

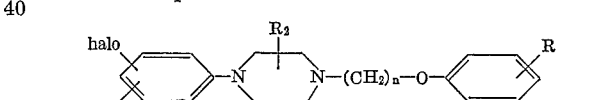

wherein R is a member selected from the group consisting of hydrogen, halogen, nitro, diloweralkylamino, lower alkyl and lower alkoxy; $R_1$ is a member selected from the group consisting of halogen and lower alkyl; $R_2$ is a member selected from the group consisting of hydrogen and methyl; $n$ is a whole number from 1 to 12 inclusive; and $m$ is a whole number from 1 to 2 inclusive.

References Cited by the Examiner

UNITED STATES PATENTS

| | | | |
|---|---|---|---|
| 2,229,024 | 1/1941 | Bruson | 260—268 |
| 2,415,786 | 2/1947 | Buck | 260—268 |
| 2,575,122 | 11/1951 | Pollard et al. | 260—268 |
| 2,695,295 | 11/1954 | Swain | 260—268 |
| 2,891,063 | 6/1959 | Sommers | 260—268 |

OTHER REFERENCES

Burger: Medicinal Chemistry, pages 77–78, 2nd edition (1960).

Swain et al.: Journal American Chemical Society, vol. 76, pp. 5091–5093 (1954).

HENRY R. JILES, *Acting Primary Examiner.*

WALTER A. MODANCE, *Examiner.*

JAMES W. ADAMS, N. H. STEPNO,
*Assistant Examiners.*